United States Patent [19]

Lisak

[11] Patent Number: 5,270,907
[45] Date of Patent: Dec. 14, 1993

[54] INTEGRAL PLASTIC SOCKET ASSEMBLY WITH INSERT-MOLDED METAL SUPPORTS FOR HEADLAMP MOUNTING ARRANGEMENT

[75] Inventor: Stephen P. Lisak, Arab, Ala.

[73] Assignee: Textron Inc., Providence, R.I.

[21] Appl. No.: 770,570

[22] Filed: Oct. 3, 1991

[51] Int. Cl.$^5$ .............................................. F21M 3/22
[52] U.S. Cl. ...................... 362/66; 362/80; 362/421; 362/428
[58] Field of Search ............ 362/61, 66, 80, 285, 362/287, 418, 419, 421, 427, 428, 288; 403/134

[56] References Cited

U.S. PATENT DOCUMENTS

| | | | |
|---|---|---|---|
| 4,527,803 | 7/1985 | Rose | 403/134 |
| 4,689,725 | 8/1987 | Saijo et al. | 362/428 |
| 4,742,435 | 5/1988 | Van Duyn et al. | 362/66 |
| 4,894,754 | 1/1990 | Levilain | 362/66 |
| 4,916,583 | 4/1990 | Nagasawa | 362/61 |
| 4,920,463 | 4/1990 | Montet | 362/61 |
| 4,947,306 | 8/1990 | O'Shaughnessey | 362/66 |
| 4,998,184 | 3/1991 | Honig | 362/66 |
| 5,063,481 | 11/1991 | Martin | 362/66 |

Primary Examiner—Richard R. Cole
Attorney, Agent, or Firm—Trexler, Bushnell, Giangiorgi & Blackstone, Ltd.

[57] ABSTRACT

An integral socket assembly with insert molded metal support structure is molded as a unit and is mounted on a headlamp assembly to enable adjusting the headlamp alignment. The integral socket assembly includes a support bracket which is secured to the headlamp structure, and integrally molded with the support bracket are coupling sockets for receiving the coupling members formed on movable adjusting screws which translate to adjust the orientation of the integral socket assembly and the headlamp structure secured thereto. The support bracket has a metal reinforcing element insert molded therein to reinforce the structural integrity of the bracket and the securement to the headlamp structure. The coupling socket can also include a seal member removably covering an entrance opening to the socket cavity in order to prevent entry of debris into the coupled joint.

21 Claims, 3 Drawing Sheets

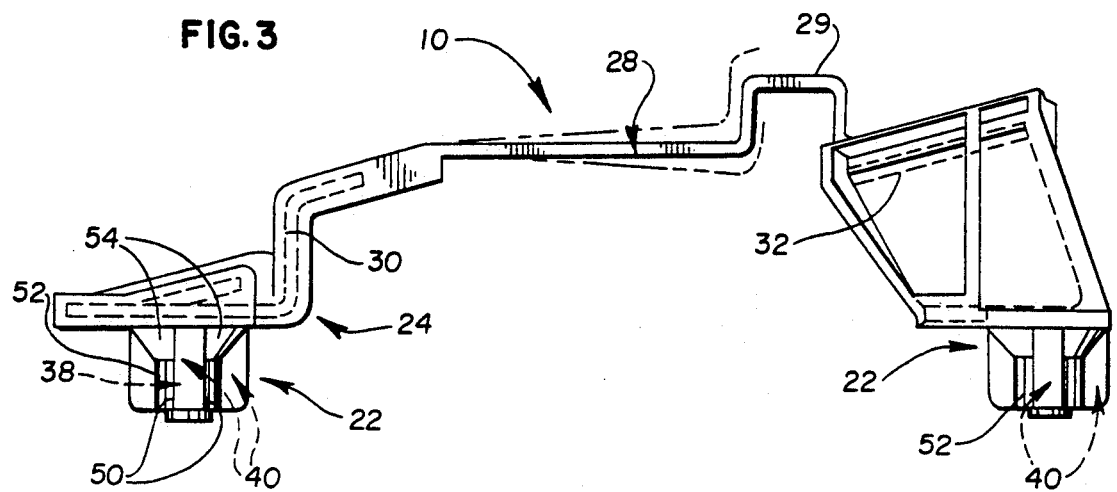
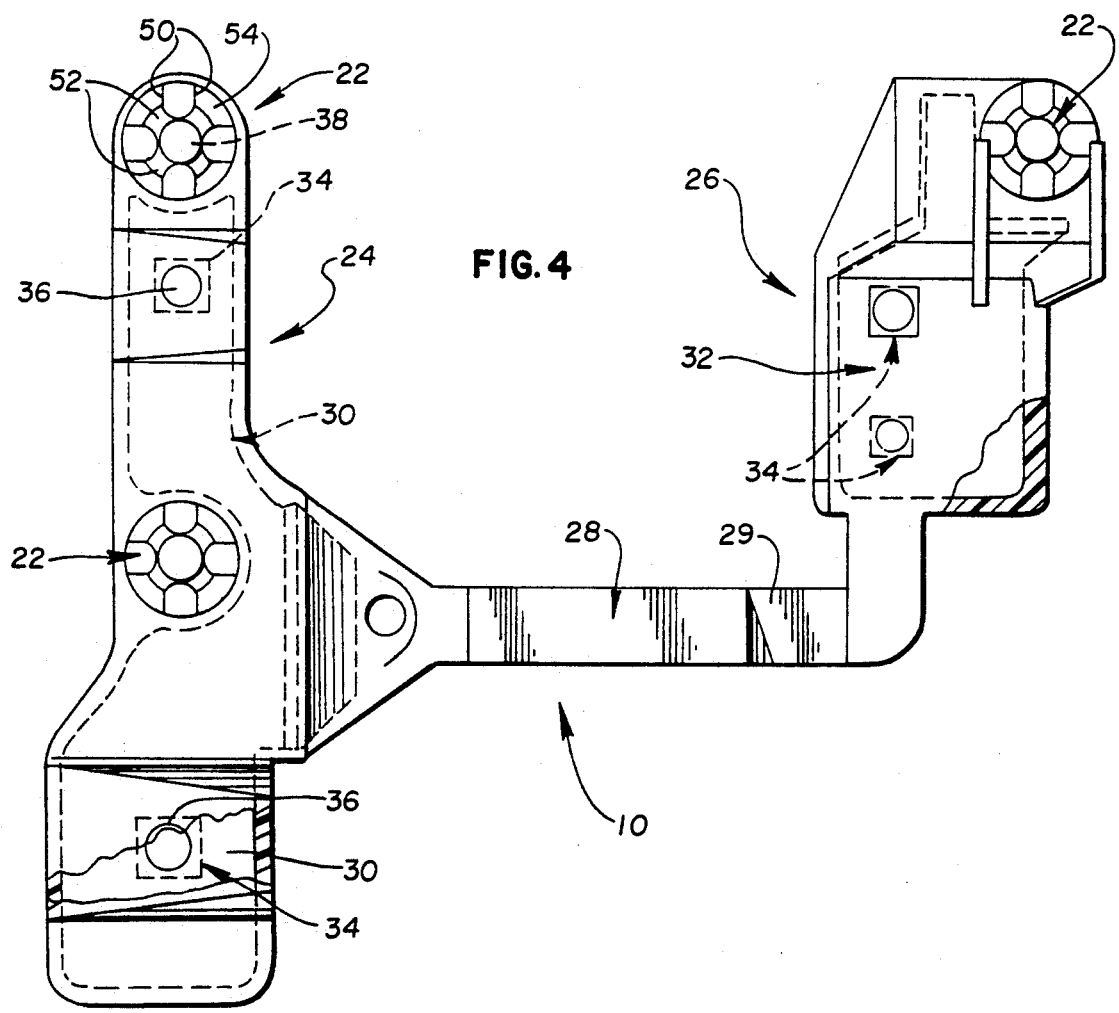

A

INTEGRAL PLASTIC SOCKET ASSEMBLY WITH INSERT-MOLDED METAL SUPPORTS FOR HEADLAMP MOUNTING ARRANGEMENT

BACKGROUND OF THE INVENTION

The present invention relates to adjusting mechanisms for alignment of automotive headlamps or the like, and more particularly relates to improved assembly and construction of such mechanisms.

Particularly successful modern adjusting mechanisms for alignment of vehicle headlamps are described for example in U.S. Pat. Nos. 4,674,018 and 4,893,219. In the described mechanisms an adjusting screw is coupled to the headlamp housing and extends into a gearbox or adjustment mechanism. The adjusting screw is operatively coupled to an adjusting drive shaft which is operated by conventional hand tools, by means of a pair of mitered gears and a threaded connection. The gear members can be assembled and sealed within the integral gear housing, while allowing the drive shaft and adjusting screw components to be assembled at a later time with a variety of shaft and screw lengths as required for different vehicle models.

Typically, multiple adjusting screws on adjustment mechanisms are employed for separate adjustment of vertical and horizontal alignment of the headlamp assembly, and each of the adjustment screws carries a coupling ball which is coupled into a socket to form a ball joint which transmits the axial translation of the adjusting screw to the headlamp assembly through a bracket which supports the socket and is fastened to the headlamp assembly. Conventionally, the socket support and securing bracket has been fabricated from metal for structural integrity and durability for headlamp adjustments through the life of the vehicle. The ball joint sockets, on the other hand, have been molded from a resilient plastic allowing the socket deformation to accept the snap-fit insertion of the coupling ball and retaining grip of the ball thereafter. However, press-fit mounting of the socket into a receiving hole in the bracket has led to a retention problem when the fit of the socket into the hole is too loose, or on the other hand when the hole/socket fit is too tight the socket can crack during the mounting insertion. In addition, the precision required to achieve a successful insertion of the socket into the bracket results in a time-consuming operation, particularly when multiple sockets and multiple brackets must be handled and assembled for each headlamp assembly. These and other disadvantages are eliminated in accordance with the present invention.

SUMMARY OF THE INVENTION

In accordance with the present invention, an integral socket assembly with insert molded metal support structure is molded as a unit and is mounted on a headlamp assembly to enable adjusting the headlamp alignment. The integral socket assembly includes a support bracket which is secured to the headlamp structure, and integrally molded with the support bracket are coupling sockets for receiving the coupling members formed on movable adjusting screws which translate to adjust the orientation of the integral socket assembly and the headlamp structure secured thereto. The support bracket has a metal reinforcing element insert molded therein to reinforce the structural integrity of the bracket and the securement to the headlamp structure.

In a preferred embodiment, the bracket of the integral socket assembly includes a first portion having at least one coupling socket and a second portion having at least one coupling socket. The first and second bracket portions are joined by a flexible connecting web in order to facilitate separate coupling of the respective sockets with the translating adjusting screws. Each of the first and second bracket portions has a respectively insert-molded, metal reinforcing member to reinforce the separate securement of the bracket portions to the housing of the headlamp structure. Each of the respective metal reinforcing members includes mounting apertures for passage of fasteners securing the headlamp housing. The metal mounting apertures are embedded within the molded plastic of the bracket portions which have smaller mounting apertures concentric with the metal, mounting apertures. In effect, the peripheral edge of the plastic material provides a lining or coating of plastic material about the aperture to preclude exposure of the metal and subsequent corrosion. Also, since the location and size of the final aperture is determined by the plastic material, close tolerances as to aperture size and location can be attained.

In preferred configuration, the integrally molded coupling sockets each have a cavity to form a ball joint with a coupling ball carried on the end of the respective adjusting screw. Each socket has a plurality of clearance slots radially extending from the cavity so that the slots subdivide the cavity wall in order to promote resilient deformation of the cavity wall and increased gripping of the coupling ball upon retraction of the respective adjusting screw to prevent withdrawal and uncoupling of the ball from the socket. An alternate socket design also includes a seal member removably covering an entrance opening to the cavity in order to prevent entry of debris into the ball joint. The seal member is seated within a collar surrounding the cavity entrance opening.

BRIEF DESCRIPTION OF THE DRAWINGS

FIG. 3 is a top view of the integral socket assembly shown in FIG. 1;

FIG. 4 is a front view of the integral socket assembly shown in FIGS. 1 and 3;

DETAILED DESCRIPTION OF THE ILLUSTRATED EMBODIMENTS

Figure 1:
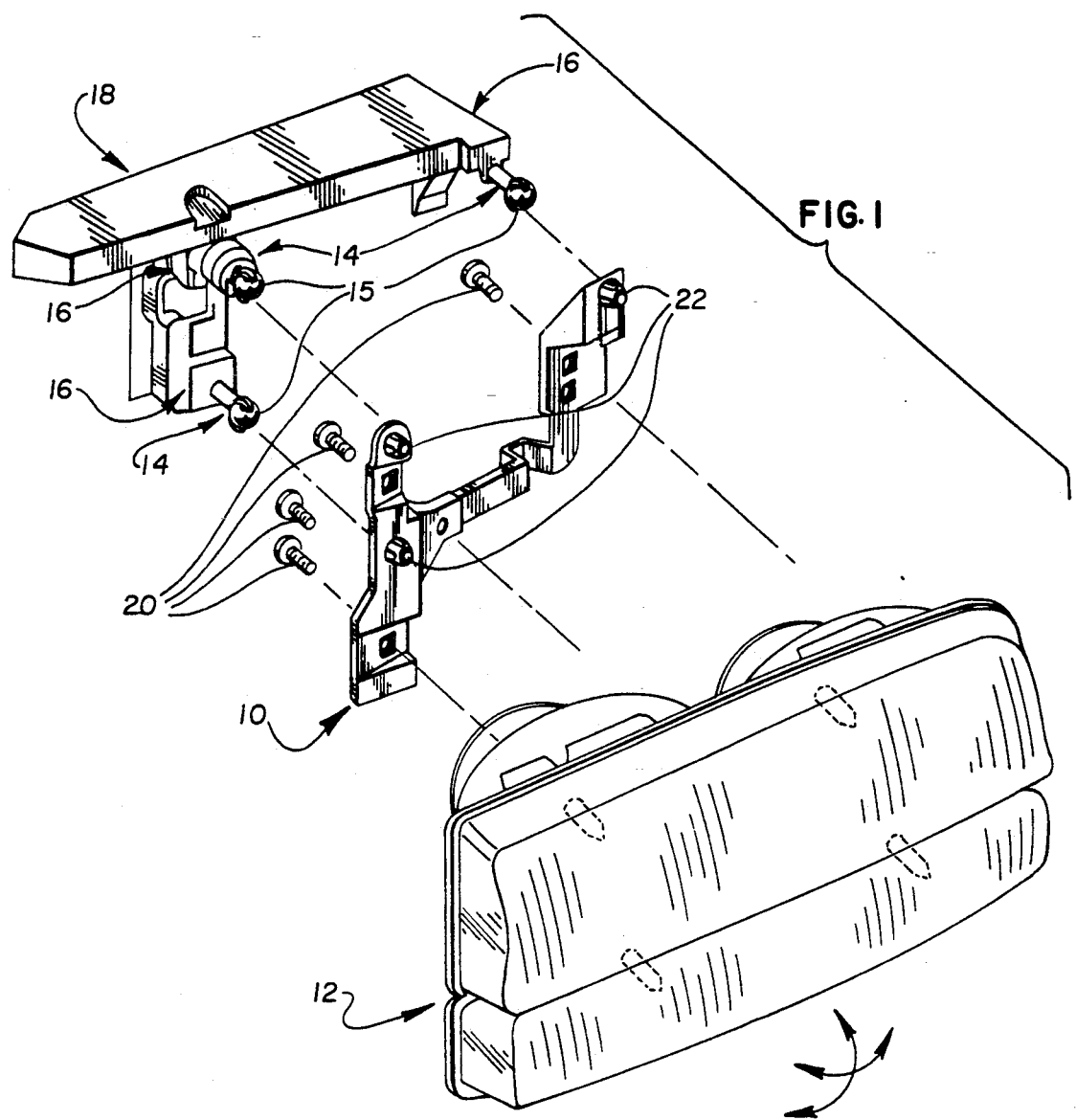
FIG. 1 is an exploded perspective view of one embodiment of the integral socket assembly according to the invention showing arrangement of a headlamp assembly.

Referring to FIG. 1, an embodiment of an integral socket assembly according to the invention, designated generally by reference character 10, is illustrated in interim position for mounting on a headlamp assembly (12) and the conventional adjustment screws (14) projecting from the respective conventional gearbox adjusting mechanisms (16) which are secured on a vehicle panel (18) in conventional manner. In the illustrated embodiment, the integral socket assembly is mounted to the headlamp assembly (12) by fastening screws (20) as more fully described hereinafter.

Referring now more particularly to the FIGS. 3 and 4, the integral socket assembly (10) includes three ball joint sockets (22) which are integrally molded from an engineering grade plastic, for example polyamides such as Zytel ® nylon, with two generally spaced bracket portions (24) and (26) which are joined by an integral web (28). The web portion (28) preferably has a U-shaped portion (29) which together provide flexibility of the web (28) enabling convenience in separately manipulating the sockets (22) when manually coupled to the respective conventional coupling balls (15) projecting from the ends of the respective adjustment screws (14) as shown in FIG. 1. The flexibility provided by the web (28) also allows the separate relative motions of the bracket portions (24) and (26) with their respective sockets during headlamp adjustment as described hereinafter.

In order to reinforce the structural integrity of the securement of each bracket portion (24) and (26) to the headlamp assembly (12) by the screws (20), a reinforcing metal plate (30) is insert molded within the bracket portion (24) and reinforcing metal plate (32) is insert molded within the bracket portion (26) during the integral molding of the socket assembly (10). The metal plates (30) and (32) are preferably entirely embedded within the plastic of the assembly (10), so that protective plating of the metal will normally be unnecessary. Consequently, the fastening apertures (34), shown in square configuration, which are stamped through the metal plates (30) and (32) can be dimensioned in oversized relationship to the diameter of the fasteners (20), with reliance upon the smaller concentric molded plastic apertures (36) to assure the proper size clearance diameter for the fasteners (20).

In the illustrated embodiment, each of the sockets (22) has a cavity generally designated by reference character 38 and a socket wall configuration which provides for a resilient expansion when the coupling ball (15) is inserted into the cavity. Thereafter, the socket (22) grips the coupling ball (15) to provide a secure joint. In addition, the socket configuration provides for increased gripping of the ball upon a retractive motion of the ball (15) and adjusting screw (14) when the desired headlamp adjustment requires the retractive displacement of the socket and bracket with the adjusting screw as the bi-directional arrow (A) indicates in FIG. 6.

Figure 2:
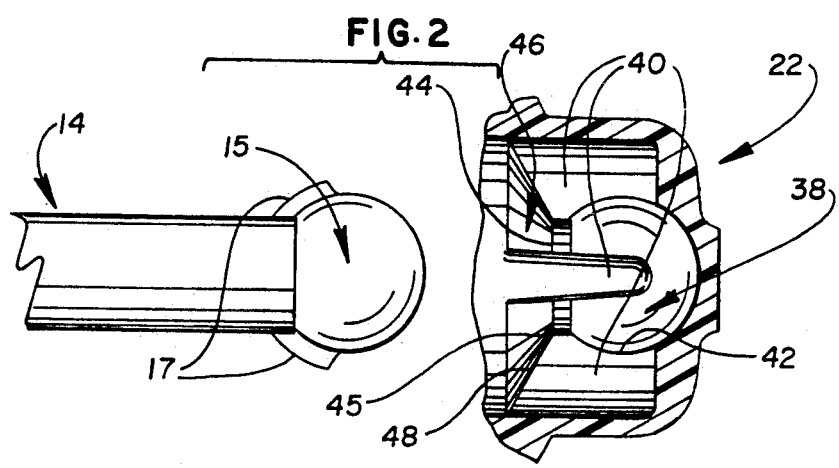
FIG. 2 is a vertical sectional view of one of the integrally formed sockets of the integral socket assembly shown in FIG. 1.
Figure 5:
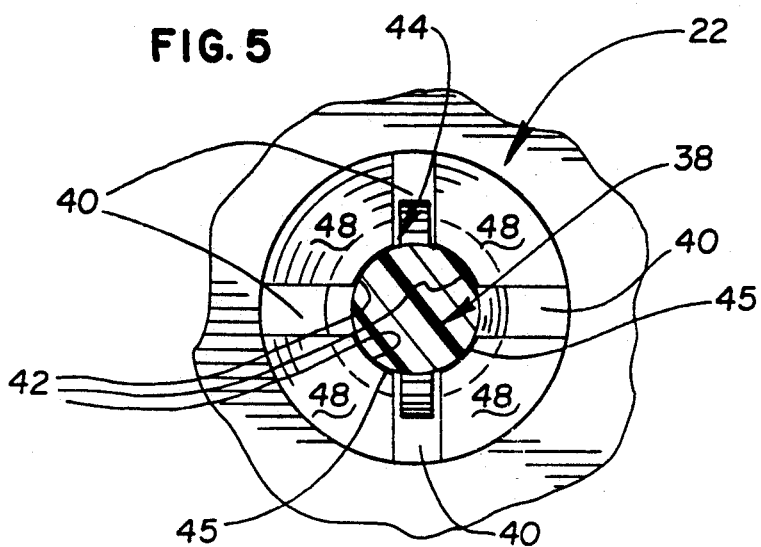
FIG. 5 is an end view of the socket shown in FIG. 2.

Referring particularly to FIGS. 2 and 5, the resilient deformation of the integrally molded sockets (22) is promoted by an annular arrangement of four clearance slots (40) radially extending from the spherical cavity (38) so that the spherical cavity wall is subdivided into four spherical wall portions (42). Prior to coupling as shown in FIG. 2, the diameter of the entrance opening (44) into the spherical cavity (38) is smaller than the diameter of the ball (15) and the cavity (38) itself; insertion of the ball (15) into the cavity (38) requires resilient expansion of the entrance opening (44) to enable the forced passage of the ball (15) therethrough, and the slots (40) promote the resilient expansion of the cavity wall portions (42) in order to accommodate the enlargement of the entrance opening (44) with the forced passage of the ball (15). Slightly raised reinforcing lips (45) are formed on the periphery of the opening (44) in order to withstand the forced passage of the ball. After the ball (15) is fully inserted within the cavity (38), the wall portions (42) relax in resilient contraction around the ball (15) and the entrance (44) contracts therewith to generally resume a diameter which is again smaller than the ball diameter. When it is necessary to retract the adjusting screw (14) (in leftward translation as viewed in FIGS. 2 and 6) during headlamp adjustment, the retractive pressure of the larger ball (15) upon the smaller internal periphery of the entrance opening (44) results in a tendency of the entrance (44) to further contract causing the cavity wall portions (42) to similarly contract against the ball (15) and increase their grip of the ball (15). The increased grip by socket (22) pulls the integrally connected respective bracket portion (24) or (26) which is thus displaced with the adjusting screw (14) causing the desired pivotal adjustment of the secured headlamp assembly (12) as indicated in FIG. 1.

In addition to promoting the resilient deformation of the socket wall portions (42), the slots (40) also respectively receive one or more ear portions (17) formed on the coupling ball (15) in order to obstruct and prevent any rotation of the ear (17) and ball (15) when the respective adjusting screw (14) is axially translated in the desired adjusting motion.

Referring again particularly to FIGS. 2 and 5, each socket (22) has a guiding pilot recess (46) leading to the cavity entrance opening (44). The slots (40) extend through the recess and thus separate floor wall portions (48) which are inclined toward the entrance (44). The slots (40) thus enable the resilient deformation of the floor wall portions (48) with the respective contiguous cavity side wall portions (42).

In order to further promote the described resilient deformation of the socket wall portions, the exterior configuration of each socket is molded to reflect the interior configuration of the socket. Thus, as best shown in FIGS. 3 and 4, exterior wall surfaces (50) which define the internal slots (40) are exposed and spaced in order to enable similar exposure of the exterior surfaces (52) of the respective cavity side wall portions (42) and similar exposure of the inclined exterior surfaces (54) of the respective recess floor wall portions (48).

Figure 6:
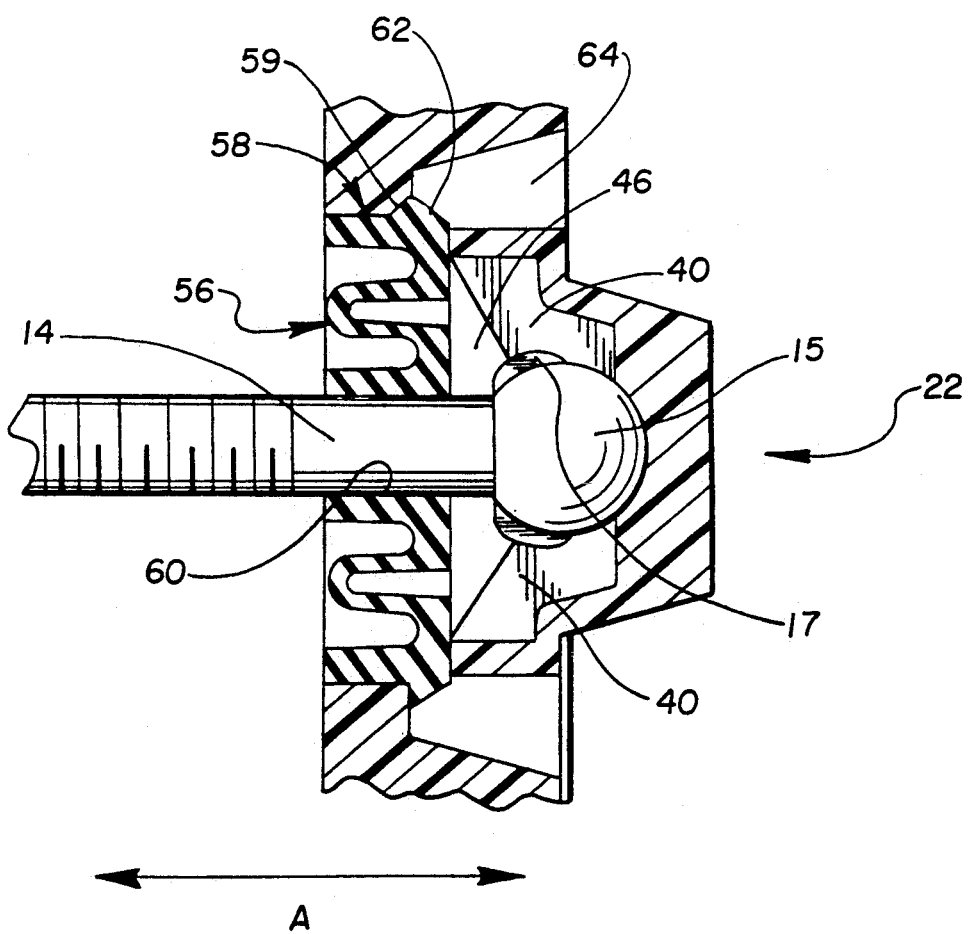
FIG. 6 is a sectional view of a socket similar to FIG. 2 in which a coupling ball is inserted and a seal member covers the entrance opening of the resulting ball joint.

Referring now to FIG. 6, in order to prevent entry of particulate or other debris into the ball joint and socket (38), an annular, elastomeric seal member (56) is seated within a collar (58) circumscribing the socket recess (46). The seal member (56) has a central aperture (60) through which the adjusting screw (14) rearwardly projects from the coupling ball (15). In the illustrated embodiment, the seal member (56) has an annular anchoring projection (62) extending through a passageway 59 in said collar 58 into a press-fit receiving mortise (64) to assure the removably anchored retention of the seal member within the collar (58).

In operation, the illustrated embodiment of the integral socket assembly (10), the lower left socket (22) in the bracket portion (24) as viewed in both FIGS. 1 and 4, couples the translation of the corresponding adjusting screw (14), to provide a resulting vertical, pivotal adjustment of the entire headlamp assembly (12), whereas the coupling by the upper left socket (22) in the bracket portion (24) and the opposing socket (22) in the bracket portion (26) similarly adjust horizontal alignment of the headlamp assembly (12).

While particular embodiments of the present invention have been described herein, it will be obvious to those skilled in the art that changes and modifications in various aspects may be made without departing from the broad scope of the invention. Consequently, the scope of the invention is not limited by any particular embodiment but is defined by the appended claims and the equivalents thereof.

The invention is claimed as follows:

1. An integral socket assembly particularly for use in adjusting alignment of a headlamp, comprising integrally: a moulded support bracket for securement to a headlamp structure, said support bracket including at least one metal reinforcing element insert molded therein for reinforcing structural integrity of said bracket and securement, wherein said metal reinforcing element includes at least one mounting aperture for said securement, said mounting aperture being embedded within said support bracket; and integrally molded with said support bracket at least one coupling socket for receiving a coupling member on a movable adjusting member which longitudinally translates to adjust orientation of said bracket and alignment of the headlamp.

2. An integral socket assembly particularly for use in adjusting alignment of a headlamp, comprising integrally; a moulded support bracket for securement to a headlamp structure, said support bracket including at least one metal reinforcing metal element insert molded therein for reinforcing structural integrity of said bracket and securement; and integrally molded therewith at least one coupling socket for receiving a coupling member on a movable adjusting member which longitudinally translates to adjust orientation of said bracket and alignment of the headlamp; said coupling socket comprising a cavity for receiving a coupling ball defining said coupling member on said adjusting member, whereby said coupling socket and ball cooperate to define a ball joint; said socket further comprising a collar projecting from said cavity, said collar receiving a seal member in order to prevent entry of debris into the ball joint formed by said coupling ball and cavity, wherein said seal member includes an anchoring projection extending therefrom and secured within a passageway through said collar into a mortise formed in said socket in order to ensure retention of said seal member within said collar.

3. An integral socket assembly particularly for use in adjusting alignment of a headlamp, comprising integrally; a moulded support bracket for securement to a headlamp structure, and integrally molded therewith at least one coupling socket for receiving a coupling member on a movable adjusting member which longitudinally translates to adjust orientation of said bracket and alignment of the headlamp, wherein said bracket comprises a first portion including at least one said coupling socket, and a second portion comprising at lest one said coupling socket, said first and second bracket portions joined by a flexible connecting portion of said bracket in order to facilitate separate coupling of said respective sockets, said first bracket portion comprising a first metal reinforcing element insert molded therein, and said second bracket portion comprising a second metal reinforcing element insert molded therein, for reinforcing structural integrity of said bracket portions and respective securement, wherein each of said first and second metal reinforcing elements includes respective mounting apertures for said securement, said mounting apertures being embedded within said respective first and second bracket portions.

4. An integral socket assembly according to claim 3 wherein each of said first and second bracket portions includes mounting apertures smaller and concentric with said reinforcing element mounting apertures such that an entire peripheral edge of each of said reinforcing member mounting apertures is embedded within a peripheral edge of said respective bracket mounting apertures in order to prevent any exposure of metal at said reinforcing member mounting apertures.

5. A socket assembly having a cavity for receiving a coupling element to form a joint for particular use in adjusting alignment of a headlamp, said socket comprising an entrance opening into said cavity for insertion of said coupling element therethrough; a collar projecting from a peripheral edge defining said cavity opening; and a seal member removably covering said cavity opening in order to prevent entry of debris into the joint, and said seal member being seated within said collar, wherein said seal member includes an anchoring projection extending therefrom and secured within a passageway through said collar into a mortise formed in said socket in order to ensure retention of said seal member covering said cavity entrance opening.

6. An integral socket assembly according to claim 5 wherein said socket and a defining wall of said cavity have a configuration enabling resilient contraction thereof to increase gripping said ball upon retractive engagement by said ball, in order to prevent vibrational uncoupling of said ball from said socket.

7. An integral socket assembly according to claim 6 wherein said socket further comprises a plurality of clearance slots radially extending from said cavity and subdividing said cavity wall in order to promote said resilient contraction.

8. An integral socket assembly according to claim 7 wherein said cavity further includes an entrance opening through which said ball can be inserted and an oppositely arranged bottom wall of said cavity, and wherein said subdividing forms at least first and second side wall portions of said cavity wall.

9. An integral socket assembly according to claim 8 wherein said socket further comprises a guiding pilot recess leading to said cavity entrance opening, said recess comprising a floor wall inclined toward said cavity entrance opening.

10. An integral socket assembly according to claim 9 wherein each of said plurality of slots axially extends through said floor wall of said recess in order to further promote resilient contraction of said entrance opening and said increased gripping of said ball.

11. An integral socket assembly according to claim 10 wherein said socket further comprises a reinforcing lip formed at said entrance opening.

12. An integral socket assembly particularly for use in adjusting alignment of a headlamp, comprising integrally: a support bracket for securement to a headlamp structure, comprising a first bracket portion including a first metal reinforcing element insert molded therein, and a second bracket portion including a second metal reinforcing element insert molded therein, to reinforce structural integrity of said bracket portions and said respective securement; and integrally molded therewith at least one coupling socket for receiving a coupling element on a movable adjusting member which translates to adjust orientation of said bracket and alignment of the headlamp, wherein said first and second bracket portions are joined by a flexible connecting portion of said bracket in order to facilitate separate coupling of said respective sockets and wherein each of said first and second reinforcing elements includes respective mounting apertures for said securement, said mounting apertures being embedded within said respective first and second bracket portions.

13. An integral socket assembly according to claim 12 wherein each of said first and second bracket portions includes mounting apertures smaller and concentric with said reinforcing element mounting apertures such that an entire peripheral edge of each of said reinforcing member mounting apertures is embedded within a peripheral edge of said respective bracket mounting apertures in order to prevent any exposure of metal at said reinforcing member mounting apertures.

14. An integral socket assembly according to claim 12 wherein said first bracket portion comprises least one said coupling socket, and said second bracket portion comprises at least one said coupling socket.

15. An integral socket assembly according to claim 12 wherein said coupling socket comprises a cavity for receiving a coupling ball defining said coupling element.

16. An integral socket assembly according to claim 12 wherein said socket and a defining wall of said cavity have a configuration enabling resilient contraction thereof to increase gripping said ball upon retractive engagement by said ball, in order to prevent vibrational uncoupling of said ball from said socket.

17. An integral socket assembly according to claim 16 wherein said socket further comprises a plurality of clearance slots radially extending from said cavity and subdividing said cavity wall in order to promote said resilient contraction.

18. An integral socket assembly according to claim 17 wherein said cavity further includes an entrance opening through which said ball can be inserted and an oppositely arranged bottom wall of said cavity, and wherein said subdividing forms at least first and second side wall portions of said cavity wall.

19. An integral socket assembly according to claim 18 wherein said socket further comprises a guiding pilot recess leading to said cavity entrance opening, said recess comprising a floor wall inclined toward said cavity entrance opening.

20. An integral socket assembly according to claim 19 wherein each of said plurality of slots axially extends through said floor wall of said recess in order to further promote resilient contraction of said entrance opening and said increased gripping of said ball.

21. An integral socket assembly according to claim 20 wherein said socket further comprises a reinforcing lip formed at an entrance opening to said cavity.

* * * * *